(12) United States Patent
Buerli et al.

(10) Patent No.: US 10,781,955 B2
(45) Date of Patent: Sep. 22, 2020

(54) CONNECTOR

(71) Applicant: Georg Fischer JRG AG, Sissach (CH)

(72) Inventors: Stephan Buerli, Frenkendorf (CH); Thomas Knoernschild, Reinach (CH)

(73) Assignee: Georg Fischer JRG AG, Sissach (CH)

( * ) Notice: Subject to any disclaimer, the term of this patent is extended or adjusted under 35 U.S.C. 154(b) by 158 days.

(21) Appl. No.: 15/911,961

(22) Filed: Mar. 5, 2018

(65) Prior Publication Data

US 2018/0274705 A1 Sep. 27, 2018

(30) Foreign Application Priority Data

Mar. 23, 2017 (EP) .................................... 17162486

(51) Int. Cl.
| | |
|---|---|
| *F16L 37/133* | (2006.01) |
| *F16L 37/086* | (2006.01) |
| *F16L 33/22* | (2006.01) |
| *F16L 37/138* | (2006.01) |

(52) U.S. Cl.
CPC .......... *F16L 37/133* (2013.01); *F16L 33/225* (2013.01); *F16L 37/086* (2013.01); *F16L 37/138* (2013.01)

(58) Field of Classification Search
CPC ....... F16L 37/086; F16L 37/101; F16L 37/12; F16L 37/088; F16L 37/138; F16L 37/133; F16L 33/225
USPC ..................... 285/82, 86, 308, 315
See application file for complete search history.

(56) References Cited

U.S. PATENT DOCUMENTS

| 4,451,069 A | 5/1984 | Melone |
| 4,902,045 A * | 2/1990 | McGugan .................. 285/82 X |
| 5,226,680 A | 7/1993 | Bahner et al. |
| 9,599,264 B2 | 3/2017 | Buerli et al. |
| 2008/0036206 A1 | 2/2008 | Li-guo |
| 2010/0287740 A1* | 11/2010 | Rigollet ................ F16L 37/088 |
| 2012/0119485 A1* | 5/2012 | Cichorek ................. 285/308 X |
| 2014/0319823 A1* | 10/2014 | Happich ............... F16L 37/133 |
| 2015/0145243 A1* | 5/2015 | Dude ........................... 285/308 |

FOREIGN PATENT DOCUMENTS

DE 4107603 C1 2/1992

* cited by examiner

*Primary Examiner* — Zachary T Dragicevich
(74) *Attorney, Agent, or Firm* — Harness, Dickey & Pierce, P.L.C.

(57) ABSTRACT

Releasable connector for connecting to a supporting sleeve, preferably made from plastic, the connector serving to connect a functional element to a supporting sleeve, comprising an inner sleeve, the inner sleeve having a standard region for connecting to a supporting sleeve and a functional element for defining the further use, the inner sleeve being configured in one piece, and a sliding sleeve for clamping and opening the clamping of the inner sleeve on a supporting sleeve, the sliding sleeve being arranged on the outer circumference of the inner sleeve in the standard region, the sliding sleeve being arranged in an axially displaceable manner for clamping and opening the inner sleeve on a supporting sleeve.

8 Claims, 4 Drawing Sheets

CONNECTOR

CROSS-REFERENCE TO RELATED APPLICATIONS

This application claims the benefit and priority of European Patent Application No. 17 162 486.9 filed Mar. 23, 2017. The entire disclosure of the above application is incorporated herein by reference.

BACKGROUND OF THE INVENTION

Technical Field

The invention relates to a releasable connector for connecting to a supporting sleeve preferably of a clamping fitting for pipes, preferably made from plastic, the connector serving to connect a functional element to a supporting sleeve preferably of a clamping fitting for pipes, comprising an inner sleeve, the inner sleeve having a standard region for connecting to a supporting sleeve preferably of a clamping fitting and a functional element for defining the further use, the inner sleeve being configured in one piece, and a sliding sleeve for clamping and opening the clamping of the inner sleeve on a supporting sleeve preferably of a clamping fitting.

Discussion

Connectors of this type serve for the modular construction of pipe connections, the connector according to the invention not serving directly to connect the pipe, but rather serving for the option of modular construction of a pipe connection with individual connector options and/or with different connector elements. In many cases, connector elements of this type are screwed to the corresponding receiving element, such as a distributor, an additional sealing element, such as an O-ring, also being installed in the case of plastic threads, since the plastic thread itself is not sealing or is insufficient for sealing purposes. In order to achieve approval for drinking water, however, a system attachment of the connector elements according to DVGW W 534 (Deutscher Verein des Gas-und Wasserfachs [German Technical and Scientific Association for Gas and Water] is required, which system attachment has a sealing connector thread which meets the requirements of DIN Standard EN 10226-1 which does not permit an attachment to the drinking water system by means of a sealing plastic thread, for which reason as a rule transition pieces made from plastic and a metallic connector part with a thread are to be provided if the complete part is not manufactured in one piece from plastic.

If then, as an alternative, connecting parts of this type are manufactured in one piece from plastic by way of the injection moulding process, the investment costs for the connecting parts are very high, since each of the parts requires a dedicated injection moulding die which usually then comprises a plurality of moulds for increasing the economic efficiency of the manufacturing process, and the said moulds then also being for different dimensions.

It is therefore advantageous if a base part can be injection moulded which can be coupled to existing connectors and to which further elements such as reduction pieces, closures, etc. can be connected. As a result, the component diversity is reduced without restriction of the diversity of the functions and dimensions. In addition, a connection of this type can be released simply and can be connected again to other connecting parts.

SUMMARY OF THE INVENTION

U.S. Pat. No. 4,451,069 discloses a quick-action coupling which has a plug-in part and a sleeve, a sliding sleeve being arranged on the plug-in part, which sliding sleeve is then pushed over the sleeve which is pushed onto the plug-in part, and is clamped together as a result.

It is a disadvantage here that the plug-in part has to have a long overall design, since the sliding sleeve is arranged on the plug-in part before being clamped fixedly.

It is an aspect of the invention to propose a connector which makes a simple, rapid and versatile connection to a supporting sleeve preferably of a clamping fitting possible, and which complies with the required conditions.

According to this aspect of the invention, it is achieved by virtue of the fact that the sliding sleeve is arranged on the outer circumference of the inner sleeve in the standard region, the sliding sleeve being arranged in an axially displaceable manner for clamping and opening the inner sleeve on a supporting sleeve.

The connector according to this aspect of the invention for connecting to a supporting sleeve preferably of a clamping fitting for pipes is preferably manufactured from plastic. The connector serves to connect a functional element, that is to say to connect an element which fulfils a defined function, such as a closing cap or a reduction piece, and further functional elements are also conceivable. Every desired connection can be produced by way of the said modular construction. The connector comprising an inner sleeve, the inner sleeve having a standard region for connecting to a supporting sleeve, preferably of a clamping fitting, and a functional element for defining the further use. The inner sleeve is configured in one piece, that is to say it is preferably configured as an injection moulded part. Furthermore, the connector connection comprises a sliding sleeve for clamping and opening the clamping of the inner sleeve on a supporting sleeve, preferably of a clamping fitting. The sliding sleeve of the connector connection is arranged on the outer circumference of the inner sleeve in the standard region, the sliding sleeve being arranged in an axially displaceable manner for clamping and opening the clamping of the inner sleeve on a supporting sleeve. A compact overall length of the connector can be achieved by virtue of the fact that the sliding sleeve is arranged directly on the external diameter of the inner sleeve in the standard region. The standard region of the inner sleeve always has the same form, whereas the adjoining functional element is always to be selected in accordance with the desired function. That is to say, an inner sleeve of this type can be configured on one side, for example, as a standard region for connecting to a supporting sleeve and on the other side as a covering cap which would form the end of a pipeline. It is also conceivable that the functional element is configured as a supporting sleeve, for example with a low overall size; therefore, it would be capable of being used as a reduction piece. A further standard region is also likewise conceivable as a functional element.

It is advantageous if the standard region and the functional element adjoin one another axially, the standard region having latching fingers on the side which faces away from the functional element. The latching fingers are arranged in a regular manner on the circumference of the standard region, the said latching fingers forming a type of rim. The inner sleeve preferably has from four to 20 latching fingers on the standard region, from eight to 16 latching fingers particularly preferably being arranged on the circumference.

In order to mount the connector, the latching fingers are preferably pushed over a flange which is arranged on a supporting sleeve, which necessitates that the latching fingers are of radially elastic configuration. In addition, it is advantageous if the latching fingers have a circumferentially running groove on their internal diameter, as a result of which the inner sleeve can be positioned precisely on a supporting sleeve during the assembly. As a result of the elasticity of the latching fingers, the latching fingers are pressed onto the supporting sleeve and clamped fixedly to the latter by means of the sliding sleeve.

According to one preferred embodiment, the inner sleeve has at least one latching hook. The latching hook avoids the undesired displacement of the sliding sleeve. If the sliding sleeve is situated in the rear region of the standard region, that is to say close to the functional element, the latching fingers are not surrounded by the sliding sleeve in the front region and can be pushed onto the supporting sleeve or onto its flange as a result, since their radial elasticity is not suppressed. The latching hook is then latched on the sliding sleeve in the one opening, preferably in the opening which is situated closer to the latching fingers, the said locking action being readily releasable, since it serves only for assembly. If the latching fingers are then situated on the flange of the supporting sleeve and/or the connector or the inner sleeve is clipped on the flange of the supporting sleeve, the sliding sleeve can be displaced for clamping and fastening the connector connection. The sliding sleeve is then pushed completely over the latching fingers, and the latching hook is pressed elastically downwards during the displacement of the sliding sleeve, and then springs into the following opening and latches the sliding sleeve, as a result of which the connector connection is clamped fixedly on the supporting sleeve. The sliding sleeve can be released again by means of a special tool which presses down the latching hook.

It is advantageous if the connector connection has at least two latching hooks. The latching hooks are preferably arranged in the standard region and lie opposite one another on the outer circumference of the inner sleeve.

A further preferred refinement of the invention consists in that the inner sleeve has a closing disc at the end of the standard region and/or between the functional element and the standard region, as a result of which a loss of the sliding sleeve is avoided. Since the latching fingers are elastic, the mounting of the sliding sleeve from the front is possible, by the latching fingers being pressed together radially.

As has already been mentioned, the sliding sleeve has two openings which are arranged axially behind one another and in which the latching hook hooks in accordance with the position of the sliding sleeve. The sliding sleeve preferably likewise has two openings which are arranged axially behind one another on the opposite side.

BRIEF DESCRIPTION OF THE DRAWINGS

The drawings described herein are for illustrative purposes only of selected embodiments and not all possible implementations, and are not intended to limit the scope of the present disclosure.

One exemplary embodiment of the invention will be described using the figures, the invention being restricted not only to the exemplary embodiment. In the figures.

DETAILED DESCRIPTION OF THE PREFERRED EMBODIMENTS

Figure 1:
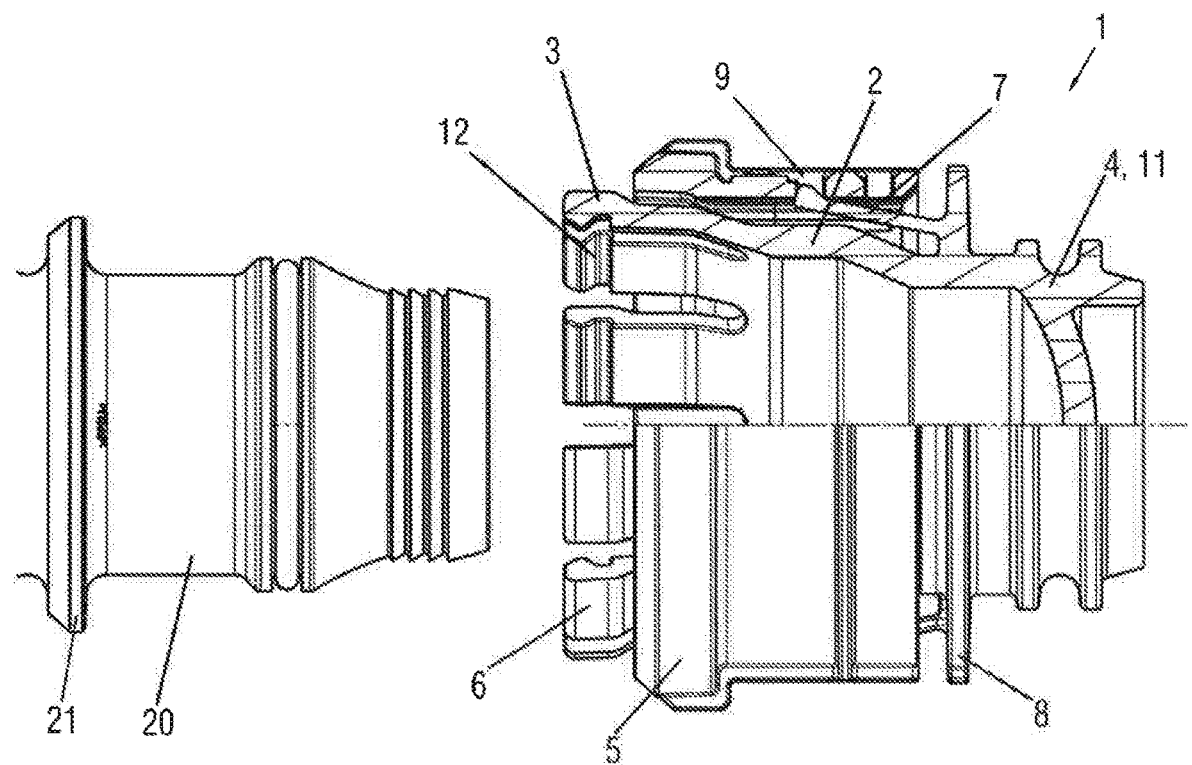
FIG. 1 shows a half section of a connector according to the invention before the mounting on a supporting sleeve.
Figure 2:
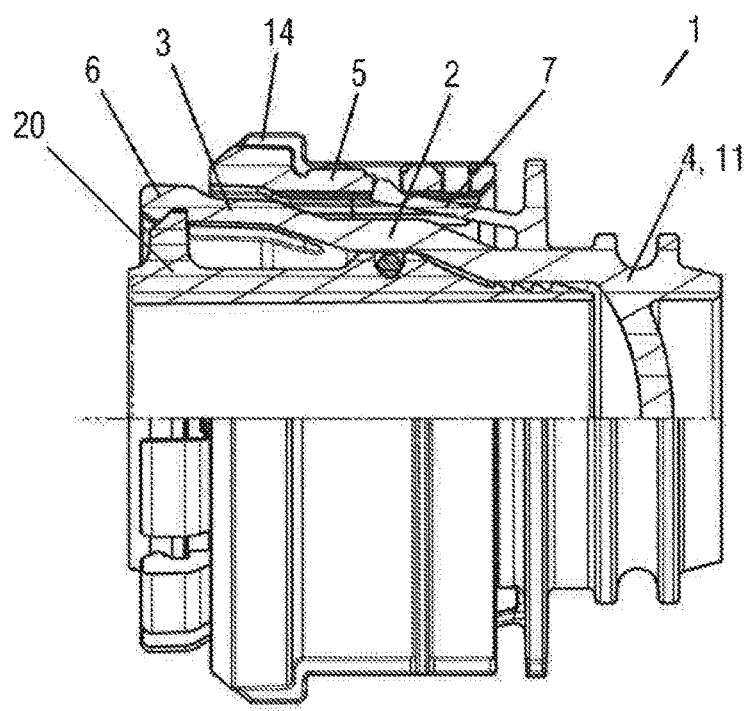
FIG. 2 shows a half section of a connector according to the invention which has already been pushed onto a supporting sleeve.
Figure 3:
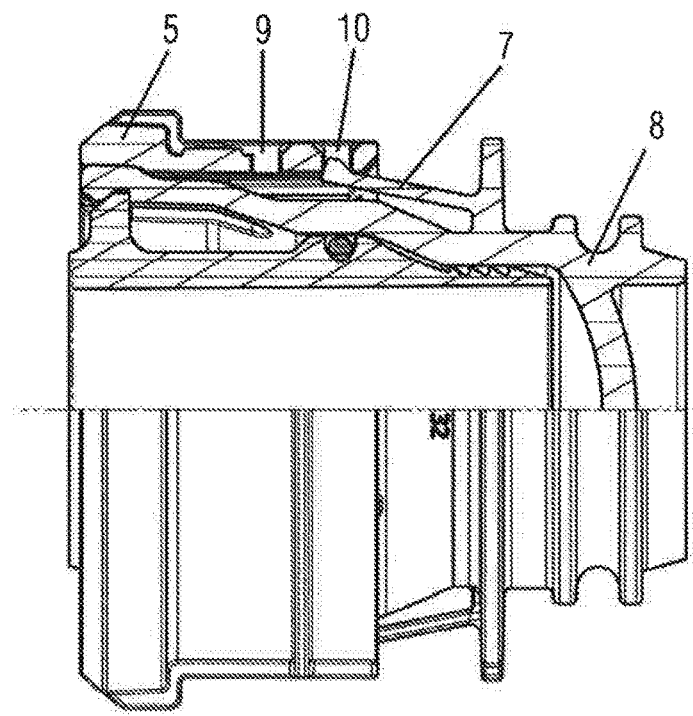
FIG. 3 shows a half section of a connector according to the invention which has been mounted and clamped fixedly on a supporting sleeve.
Figure 4:
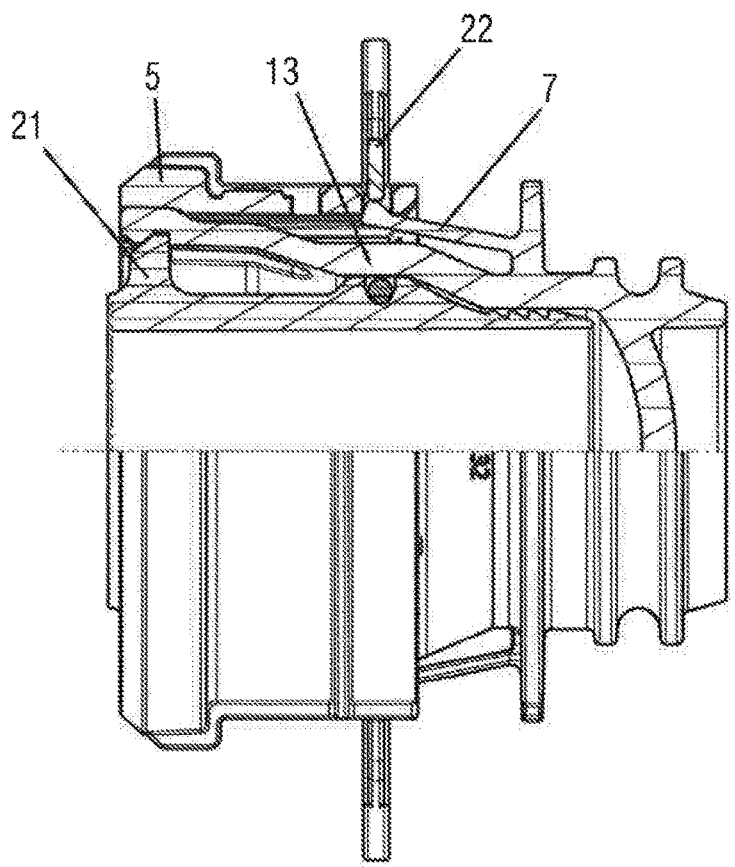
FIG. 4 shows a half section of a connector according to the invention which has been mounted on a supporting sleeve and is ready for dismantling by way of a dismantling tool.
Figure 5:
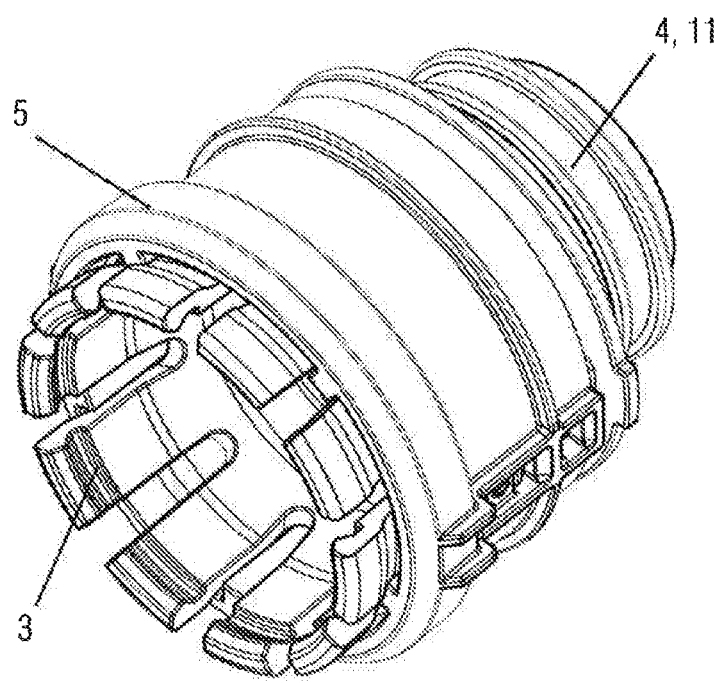
FIG. 5 shows a three-dimensional view of a connector according to the invention having the functional element of a closing cap.
Figure 6:
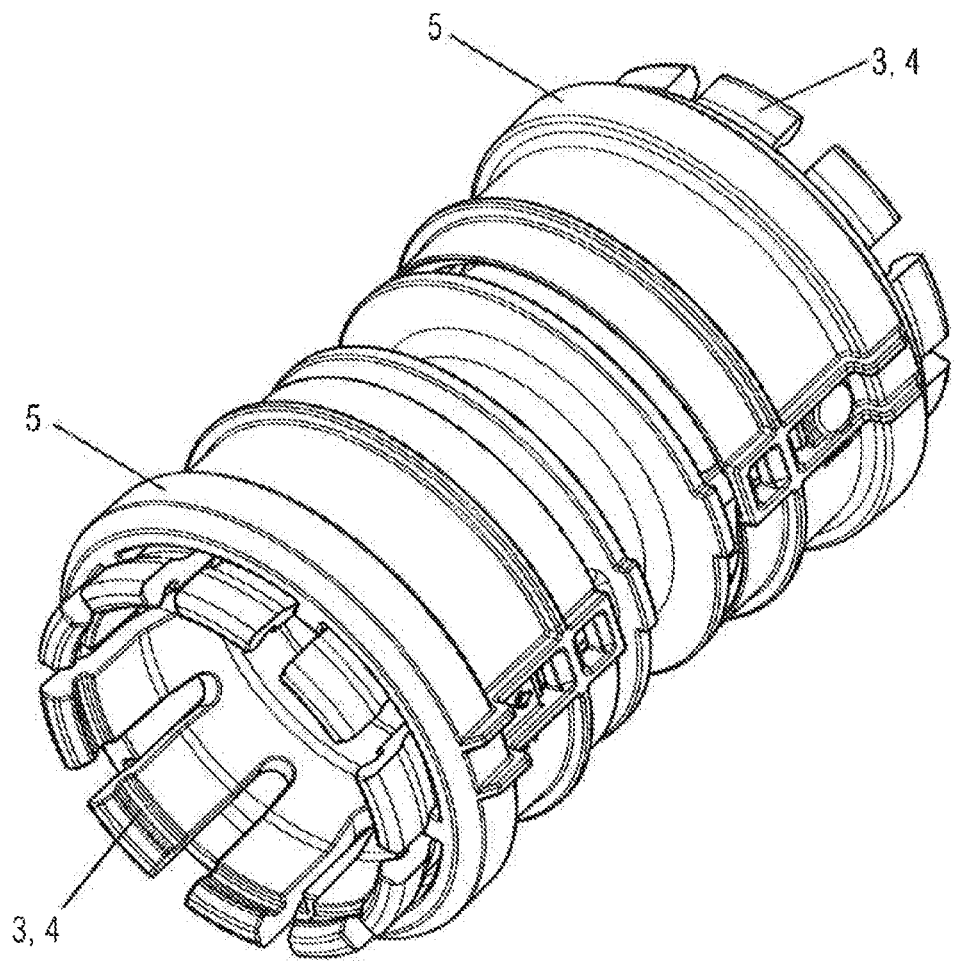
FIG. 6 shows a three-dimensional view of a connector according to the invention having the functional element of a standard region.
Figure 7:
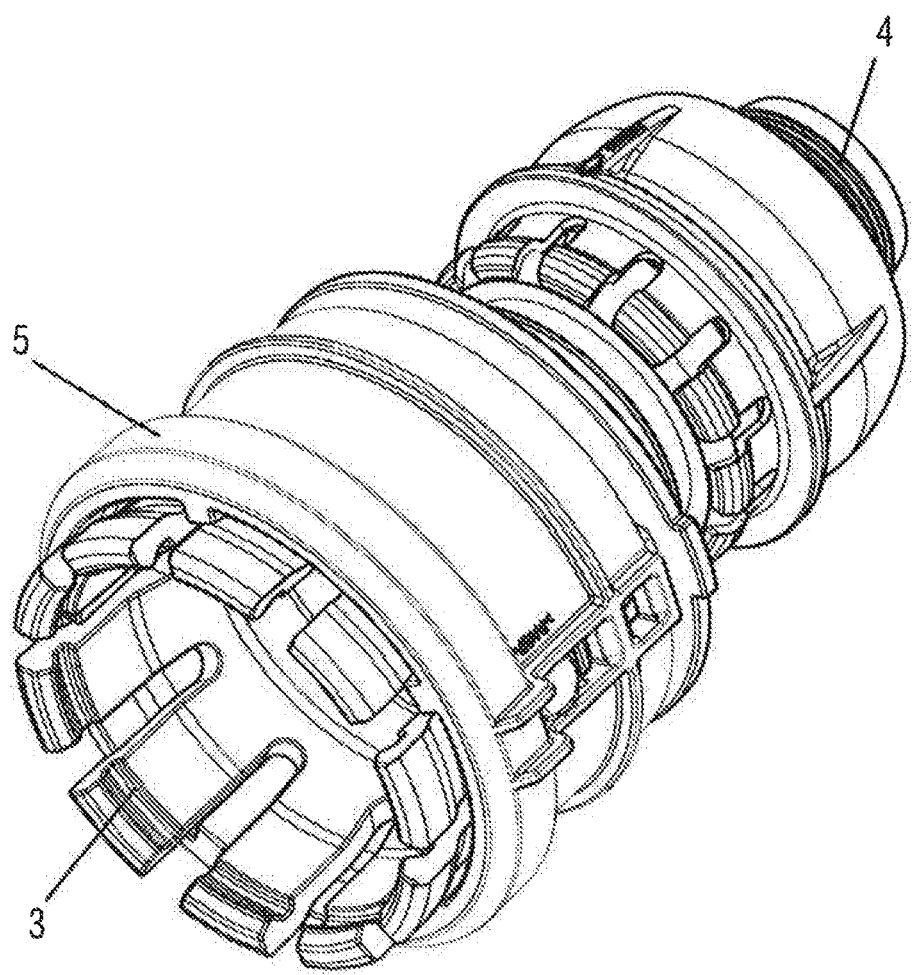
FIG. 7 shows a three-dimensional view of a connector according to the invention having the functional element of a reduced supporting sleeve.

The drawing which is illustrated in FIG. 1 shows a connector 1 according to the invention before the mounting on a supporting sleeve 20 which preferably corresponds to a supporting sleeve 20 of a clamping connection for pipes. A high modularity is achieved by virtue of the fact that different elements are compatible with one another. In order to ensure this, the connector 1 has an inner sleeve 2 which has a standard region 3 which can be coupled to a supporting sleeve 20. The standard region 3 of the inner sleeve 2 is always of identical configuration, in order to mount the connector 1 on a supporting sleeve 20. The connector 1 serves to connect a functional element 4 on a supporting sleeve and not to connect a pipe. Further functional elements 4 which define the further connection or task of the connection can be connected by way of the connector 1; for example, a closing cap 11 can be integrally formed on the inner sleeve 2 as a functional element 4, as can be seen from FIGS. 1-5. Other functional elements 4 are also conceivable, however, such as a further standard region 3 (shown in FIG. 6) which makes it possible to connect a further supporting sleeve 20, or else a reduced supporting sleeve can form the functional element 4 (as shown in FIG. 7), to which a clamping sleeve of smaller dimensions can then be directly connected and to which a pipe can then be fastened. The inner sleeve 2 with the standard region 3 and the functional element 4 is configured in one piece.

The connector 1 has a sliding sleeve 5 on the outer circumference of the inner sleeve 2 in the standard region 3, the sliding sleeve 5 being arranged in an axially displaceable manner on the inner sleeve 2 in the standard region 3. It can be seen in FIG. 2 if a supporting sleeve 20 is pushed into the connector 1. The flange 21 of the supporting sleeve 20 is then arranged in the circumferentially running groove 12 on the internal diameter of the radially elastic latching fingers 6, as a result of which the supporting sleeve 20 is positioned axially, but fixed clamping does not yet take place in the said position. By way of the displacement of the sliding sleeve 5 onto the outer edge of the inner sleeve 2, the latching fingers 6 which are arranged along the circumference of the inner sleeve 2 in the standard region 3 are pressed onto the flange 21 of the supporting sleeve 20 and/or the latching fingers 6 are clamped between the flange 21 and the sliding sleeve 5, as can be seen from FIG. 3. From four to 20 latching fingers 6 are preferably arranged along the circumference, which latching fingers 6 ensure satisfactory clamping, the latching fingers 6 being of radially elastic configuration in order to make the clamping operation and opening of the connection again possible. The connector connection 1 is configured as a releasable clamping connection, it being possible for it to be released only by way of a special tool and it being possible for it to also be used again afterwards.

In order to ensure locking of the connector connection 1 when the clamping action takes place, a latching hook 7 is arranged on the inner sleeve 2, at least two latching hooks 7 preferably being arranged which lie opposite one another on the circumference of the inner sleeve 2. The inner sleeve 2 has a closing disc 8 on that end region of the standard region 3 which is directed towards the functional element 4. The closing disc 8 forms the point of separation between the standard region 3 and the functional element 4 of the inner sleeve 2. The latching hook or latching hooks 7 is/are preferably arranged on the closing disc 8. They engage into one of the openings 9, 10 which are arranged on the sliding sleeve 5. The openings are arranged axially behind one another, two openings 9, 10 which are arranged axially behind one another likewise preferably being situated at the opposite point of the circumference of the sliding sleeve 5. The latching of the latching hook 7 in the front opening 9 can be seen from FIG. 2, with the result that the sliding sleeve 5 is locked easily but can be pushed forwards for fixed clamping of the connector 1 on a supporting sleeve 20. It can then be seen in FIG. 3 if the latching hook 7 is hooked in the rear opening 10 and the sliding sleeve 5 is then fixed in the clamping position. The special tool 22 can be seen in FIG. 4, which special tool 22 makes it possible to press down the latching hook 7 and thus to release the connector 1 on the supporting sleeve 20.

In order to ensure the seal of the connector 1, a sealing region 13 is situated on the inner sleeve 2, which sealing region 3 seals together with a seal which is preferably arranged on the supporting sleeve 20.

In order to achieve the required rigidity of the sliding sleeve 5 in the region of the clamping of the latching fingers 6, the sliding sleeve 5 is reinforced on the circumference by way of a supporting ring 14 and/or there is a thickened portion of the material in the said region.

What is claimed is:

1. A releasable connector for connecting to a supporting sleeve comprising:
   a plurality of interchangeable inner sleeves each comprising a tubular body region for receiving the supporting sleeve at one end thereof and a functional element at an opposite end thereof;
   a sliding sleeve for clamping and opening the inner sleeve on the supporting sleeve, the sliding sleeve being arranged on the outer circumference of the tubular body region of the inner sleeve, the sliding sleeve being axially displaceable for clamping and opening the inner sleeve on the supporting sleeve;
   wherein the functional element of a first inner sleeve of the plurality of inner sleeves comprises an end cap;
   wherein the functional element of a second inner sleeve of the plurality of inner sleeves comprises of a support sleeve, and
   wherein the functional element of a third inner sleeve of the plurality of inner sleeves comprises another tubular body region; and
   wherein the inner sleeve is configured in one piece and each tubular body region is identical.

2. The connector according to claim 1, wherein the tubular body region and the functional element adjoin one another axially.

3. The connector according to claim 2, wherein latching fingers are arranged in the tubular body region along the circumference on an end side which faces away from the functional element.

4. The connector according to claim 3, wherein the latching fingers are of elastic configuration, in order to make it possible to push them onto a supporting sleeve and to clamp them fixedly.

5. The connector according to claim 3, wherein the latching fingers have a circumferentially running groove on the inner circumference.

6. The connector according to claim 1, wherein the inner sleeve has at least one latching hook.

7. The connector according to claim 6, wherein the sliding sleeve has two openings which are arranged axially next to one another and serve to latch the latching hook and therefore to axially fix or position the sliding sleeve.

8. The connector according to claim 1, wherein two latching hooks are arranged in the tubular body region of the inner sleeve.

\* \* \* \* \*